Dec. 29, 1970   E. WHITESTONE   3,551,161
METHOD OF PREPARING A PROTEIN-POTATO ARTICLE
Filed Jan. 2, 1969
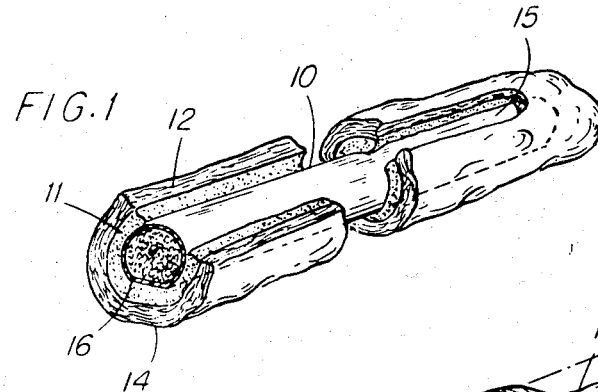
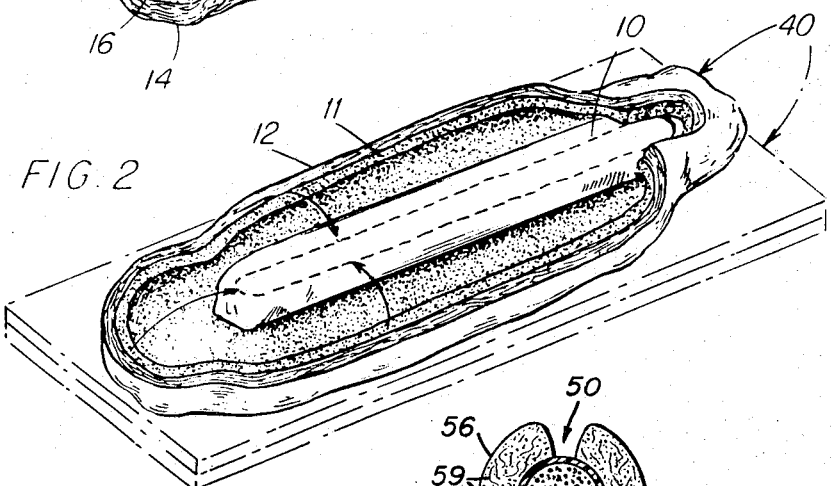
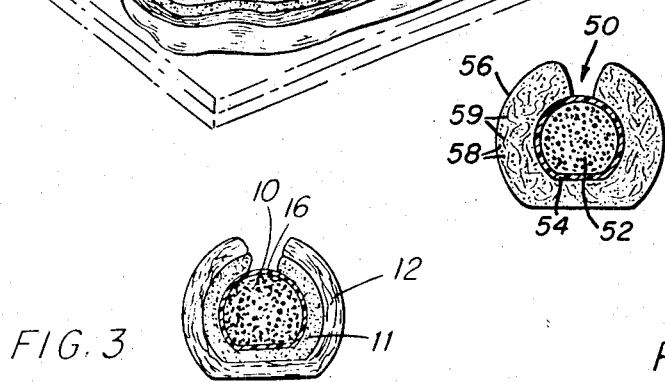
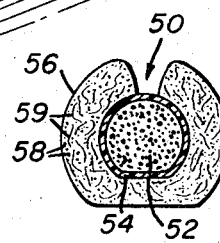
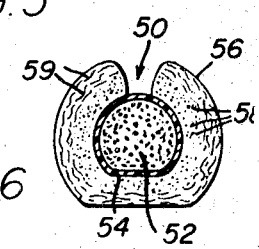
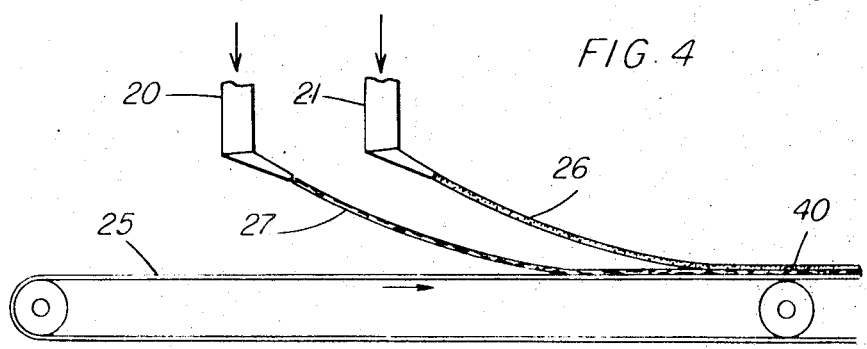

United States Patent Office 3,551,161
Patented Dec. 29, 1970

1

3,551,161
METHOD OF PREPARING A PROTEIN-POTATO ARTICLE
Esther Whitestone, 5800 Arlington Ave.,
Riverdale, N.Y. 10471
Continuation-in-part of application Ser. No. 559,809,
June 23, 1966. This application Jan. 2, 1969, Ser.
No. 788,429
Int. Cl. A23b 1/00
U.S. Cl. 99—1                    12 Claims

ABSTRACT OF THE DISCLOSURE

An improved food product is disclosed being generally characterized as a food snack comprising an edible filler such as a frankfurter, hamburger or the like which is wrapped in a mashed potato-pastry crust wrapper. The food snack can be made in several ways including wrapping the edible filler in a wrapper comprising superposed layers of mashed potato and pastry dough or wrapping the filler in a wrapper comprised of a homogenous mixture of mashed potato and pastry dough.

CROSS REFERENCE TO RELATED APPLICATIONS

This application is a continuation-in-part of my pending application Ser. No. 559,809, filed June 23, 1966, now abandoned.

BACKGROUND OF THE INVENTION

It is a well established eating habit for people to partake of light, between-meal snacks in the home, at business, and also when traveling. Preferred, but not exclusive food articles eaten on these occasions include frankfurters, hamburgers, meat sandwiches and the like. Among the reasons for this preference are the ease and speed with which the articles may be prepared and cooked. Moreover, the aforementioned food articles are formed easily in small compact shapes thereby facilitating handling of same by the user, and do not require the use of utensils for eating. Also, these food articles generally have an appealing taste, pleasing aroma and attractive appearance. The foregoing has resulted in the provision of various ways for mass producing light, economical and easily stored food articles made from a wide variety of foods. These food articles may be precooked at the time they are made and then frozen and packaged for reheating when ready for use. They may also be prepared in an uncooked state, frozen and packaged so that the ultimate user will cook the article at the time it is desired to eat it.

SUMMARY OF THE INVENTION

The present invention provides a food snack which is easily prepared and stored until ready for use and thereafter easily cooked or warmed when the user wishes to eat the snack. The food snack is characterized by its having a conveniently formed shape which gives it an attractive appearance and facilitates the eating thereof without the need to employ utensils. Furthermore, it is made of a novel arrangement of food ingredients including a meat or similar edible filler which is enclosed in a mashed potato-pastry crust wrapper, the foregoing thereby providing the food snack with a most appealable and pleasing taste.

According to the invention, the filler can be a meat in either an uncooked or a smoked state and is enclosed in a first wrapping comprising a flaky mashed potato dough with a second or outer wrapping of pastry crust enclosing the potato dough, the mashed potato and pastry crust wrappings being formed as thin sheets and then layered together before actually wrapping the meat filler therewith. The mashed potato-pastry crust wrapper also can be prepared by first preparing whipped mashed potato and allowing it to set until it cools and becomes flaky. The ingredients used for preparing the pie dough, less water, are then mixed together after which they are combined with the mashed potato and water, mixed and cooled for a period of time. The wrapper may thereafter be formed in sheets and edible fillers wrapped therein as previously described. The thus constituted food snack can then be baked and thereafter frozen to preserve the snack until the time of use. It is also possible to quick-freeze the food snack after preparing it so that the ultimate user will cook it just prior to the time it is to be eaten. The invention also provides that the meat filler can be of a varied character, including raw meats of warm blooded animals including uncooked poultry and fish. It may also include smoked fillings, especially pork and mixtures of pork and beef. However, it is important that the mashed potato and pastry crust wrappings be prepared in the manner and with the ingredient formulations to be described later in the description.

Various other objects, features and advantages of the invention will be made apparent from the description that follows, and the illustrative examples described herein and depicted in the drawing.

The invention accordingly comprises the several steps and the relation of one or more of such steps with respect to each of the others, and the article possessing the features, properties and the relation of elements all as exemplified in the following detailed description, and the scope of the invention will be indicated in the claims.

BRIEF DESCRIPTION OF THE DRAWING

FIG. 1 is a perspective view partly in section of a food snack made in accordance with the principles of the present invention, the edible filler thereof being a frankfurter.

FIG. 2 is a perspective view illustrating an intermediate point in the wrapping of the meat filler with the mashed potato and pastry crust layers.

FIG. 3 is a sectional view of a different embodiment of the food snack wherein the meat filler thereof is uncooked hamburger meat confined within an edible casing.

FIG. 4 is a schematic representation of one manner in which the mashed potato and pastry crust are layered one on the other to form an edible wrapping in which the filler is enclosed.

FIG. 5 is a sectional view similar to FIG. 3 showing an edible filler wrapped in a wrapper of a homogenous mixture of mashed potato and pastry dough before cooking the snack.

FIG. 6 is the same as FIG. 5 except it shows the manner in which the mashed potato migrates from the homogenous mixture to form an inner potato layer surrounding the edible filler as a consequence of cooking the snack.

In the description like reference numerals are used to denote like parts in the drawing.

DESCRIPTION OF THE PREFERRED EMBODIMENTS

The food snack of the present invention includes a filler 10, which is depicted by way of example in FIG. 1 as being a frankfurter. The latter can be, for example, the usual frankfurter type comprised of a smoked beef and spice mixture, or it may be a mixture of smoked beef and pork along with the customary spices and flavoring additives which has been shaped and enclosed in an animal or synthetic edible casing 16.

The filler 10 is fully enclosed as shown in FIG. 1 in an edible wrapper which in one form is comprised of an inner layer 11 of mashed potato and an outer layer 12 comprised of pastry dough, with the wrapper being molded completely around the outer surfaces of the frankfurter. The ends of the frankfurter can be enclosed as shown or if preferred, they can be left exposed. For convenience of supporting the food snack during baking, it may have a somewhat flattened bottom as shown at 14. It is also possible to provide a longitudinally directed narrow opening 15 in the wrapper along the top of the food snack to receive mustard, catsup, or a like condiment thereby facilitating the opportunity for the user to additionally flavor the food snack according to individual taste at the time of eating.

A "meat filler" as used herein is intended to mean a high protein edible filler. Such can include meat foodstuff inclusive of the edible flesh of warm blooded animals and generally denominated as beef, pork, lamb and poultry. Fish while generally not considered a meat is intended to be considered as such herein since it is a high protein product. The filler can be employed in the food snack in an uncooked or raw state, or it can be smoked first. It is also possible to use other types of high protein foodstuffs as fillers, as for example, liver, cheeses, fruit mixtures and the like. While the filler can be of various edible foodstuffs, it was found advantageous for appearance sake to make each in an elongated shape resembling a frankfurter and encase it in an edible casing to insure that the filler will retain the desired molded shape when wrapped in the mashed potato-pastry crust wrapper. Reference herein to "pastry crust" is intended to include within the scope of that term crusts made from pie dough, bread dough, biscuit dough and cake dough.

In the embodiment of the food snack 10 shown in FIG. 1, a pie crust is prepared from suitable amounts of wheat flour, butter, shortening, salt and cold water. Powdered whole milk and sugar can also be included in the pie crust. The pie crust is then worked out by rolling, extrusion or similar manner into a thin sheet of substantially uniform thickness and substantially homogeneous consistency. The pie crust may be of the conventional ingredients noted above or the ingredients may be altered to vary the ultimate taste thereof, such as by including flavoring additives, onion shreds, etc. An important requirement is that the pie crust possess a crispy texture when baked. In working the pie crust into a thin sheet it is preferable that it be reduced to a thickness of about 1/8", to provide best results for encasing a frankfurter shaped filler of approximately six inches length. If the pie crust is too thick, it tends to mask the inherent flavor of the filler.

The mashed potato layer 11 located intermediate the pie crust 12 and edible filler 15 is then prepared preferably from ingredients comprised of dehydrated mashed potato mix, water, salt and milk. Dehydrated instant mashed potato mix is convenient to use and gives excellent results although it is also possible to cook and mash fresh potatoes to a consistency suitable to provide a flaky dough when worked into a thin sheet. However, it may be necessary when using fresh potatoes to reduce the moisture content thereof before whipping them. Special flavorings and spices can also be added to the mashed potato dough. The mashed potato is then thoroughly whipped for a suitable time period at room temperature to aerate it and give it a light flaky texture, after which it is formed into a substantially flat sheet of approximately 1/8" in thickness. A flaky texture is intended as one wherein the potato stands up in peak-like projections. This sheet is then layered on top of the pie crust sheet to form therewith a composite edible wrapper in which the filler is wrapped. In practice, it was found that when the edible wrapper is formed as a composite of separate mashed potato and pie crust layers, layering the mashed potato onto the pie crust sheet is an important requirement for properly preparing the food snack. If the mashed potato merely is placed on the formed pie crust sheet and then worked or kneaded so as to spread it over the pie crust sheet, the latter becomes soggy. This is believed attributable to the working of the mashed potato resulting in an interchange of moisture therefrom to the pie crust. A too soggy pie crust will not bake satisfactorily and evenly from outside to inside.

In preparing the edible wrapper the respective sheets may be sheeted out in the maner illustrated schematically in FIG. 4, being discharged from the respective batch hoppers 20, 21 in the form of thin sheets onto a moving conveyor 25 with the mashed potato sheet 26 being layered or sheeted onto the top of the pie crust sheet 27 in the manner shown. The layering of the mashed potato sheet onto the pie crust sheet in this manner is effected smoothly and without causing intermixing of the respective doughs.

The formed wrapper sheet 40 is then advanced through suitable packaging machinery (not shown) which positions the edible foodstuff fillers on top of the flat composite wrapper sheet, cuts the wrapper sheet into sections corresponding to the size of wrapper necessary to enclose the individual fillers and ultimately wraps and molds the food snacks. The manner of wrapping the wrapper section around the filler is shown in FIG. 2 from which it will be noted that first one side of the generally rectangular wrapper section is folded against the filler and then the other side is folded over adpacent the first side. The end parts of the wrapper section are then brought together around the ends of the meat filler and the whole wrapper section molded to provide a continuous outer wrapper encapsulating the meat filler. The wrapper section can thereafter be punctured in a number of places to provide venting passages through which may be liberated vapors produced during baking.

After the food snack is formed, a wash made from fortified eggs can be applied to the outer surface of the pie crust to give the food snack a golder brown color when baked. Fortified eggs sold under the trademark Voltex can be mixed in proportions of two (2) parts by weight eggs to one (1) part by weight water, to prepare the wash, the wash being applied to the piecrust either by brush or spraying methods. A wash can also be applied to the inner surface of the wrapper section. In this case, the wash is brushed or sprayed on top of the flat wrapper section before the edible filler is placed thereon. A wash comprising four (4) parts by weight egg whites sold under the trademark Volwhip mixed with one (1) part by weight water can be used. The wash applied to the inner surface of the wrapper section serves to hold the filler in place during wrapping and molding of the food snack.

The formed food snack thereafter can be placed in a heated oven at 350° F. for about twenty minutes to bake same or it can be deep fried or pan fried. If preferred, the food snack, instead of being cooked, can be quick frozen at a suitable temperature, for example, in a range between 0° to 20° F. for sale as a frozen food. When making the food snack with a meat filler of uncooked hamburger meat (ground beef) it is preferable although not essential that same be confined in an edible casing as previously described. A suitable casing for this purpose may be of the type described in U.S. Pat. 3,123,480 which is one produced from the fibrous material of an animal, as for example, the hide which has been treated with an albuminous material to preserve it during cooking. As was mentioned, it is advantageous to stuff the hamburger meat in the edible casing in such manner that it will have a shape similar to that of a frankfurter. If other types of fillers such as fish and poultry meats are to be used in the food snack, they can also be enclosed in edible casings.

As was previously mentioned it also is possible to prepare the edible wrapper by combining the mashed potato and pie crust together to form a homogenous mashed potato-pie crust dough. In one mode of this manner of preparing the food snack, the wrapper is formed by first preparing mashed potato with suitable amounts of dehydrated instant mashed potato and water. The mashed potato is then whipped for a suitable time to thoroughly aerate same. The mashed potat is then set down under ambient conditions to cool and dry sufficiently long to become flaky in texture. A pie dough is then prepared comprising as ingredients suitable amounts of wheat flour, hydrogenated vegetable oil shortening, butter and salt. Sugar and baking powder also may be added. The ingredients are then dry mixed, i.e., without water. The dry pie dough mix is then combined with the flaky mashed potato and a suitable quantity of water. The combined mix is then mixed for a suitable period of time to give it a uniform consistency. The combined mix is then refrigerated for a period up to four hours after which it is formed into sheets, the sheets being cut into sections of individual food snack size and thereafter molded around edible fillers.

The following examples are illustrative of the present invention but they should not be taken as being restrictive of the scope thereof.

EXAMPLE 1

A pie crust was prepared from ingredients comprising by weight approximately 43 parts cake flour, 15 parts hydrogenated vegetable oil shortening, 15 parts butter, 2.5 parts sugar, 0.4 part salt, 2.5 parts powdered whole milk, 21 parts water and 0.3 part baking powder. The ingredients were mixed until the pie crust had a uniform consistency which was not sticky but sufficiently moist to be worked and shaped into a thin sheet without crumbling. Mashed potato was then prepared employing as ingredients by weight approximately 57 parts water, 24 parts milk, 18.5 parts dehydrated mashed potato mix and 0.1 to 0.6 part salt. The mashed potato ingredients were then machine whipped for a period up to about three (3) minutes to aerate the mashed potato and give it a flaky consistency. The pie crust mix was then sheeted out in the form of a thin sheet while simultaneously the mashed potato was sheeted onto the top of the pie dough sheet to form the composite wrapped sheet. Ingredients sufficient to provide wrappers for ten 1.6 to 2-ounce frankfurters were employed. The composite wrapper sheet was then sectioned into sizes suitable for wrapping the individual frankfurters and the frankfurters positioned on top of the individual wrapper members and wrapped to form the food snacks.

The ten frankfurters were then laid on a baking tray and placed in an oven at a temperature of 350° F. and baked for a period of up to about twenty (20) minutes. On sampling each of the food snacks, they were noted to have a firm evenly baked crispy outer pie crust. Also, the mashed potato had retained its shape and moist flaky texture. The taste of the food snacks was noted to be excellent and the frankfurter meat had lost none of its inherent flavor.

EXAMPLE 2

Ten food snacks were prepared as described in Example 1 except that instead of baking same, they were, immediately upon being shaped, placed in a freezer at a temperature of between 0° to about 20° F. The food snacks were left in the freezer for a period of 24 hours and then removed and immediately placed in an oven heated to 350° F. and baked for about 30 minutes. On sampling, the respective food snacks were noted to have a most palatable and pleasing taste, appearance and texture throughout.

EXAMPLE 3

Food snacks were prepared in the manner set forth in Example 1 except that instead of a smoked frankfurter meat filler, raw hamburger meat filler consisting entirely of ground beef and enclosed in an edible collagen casing was used. After baking the food snacks in an oven for twenty minutes at 350° F. during which time the hamburger meat was cooked to a well done state, the food snacks were removed and sampled, providing results comparable with those noted in Example 2.

EXAMPLE 4

Mashed potato was prepared using 33 parts by weight dehydrated mashed potato mix and 67 parts water. The mashed potato was then whipped for a period up to about ten (10) minutes to aerate same after which it was set down at room temperature to cool and assume a flaky texture. While the mashed potato was cooling, 32.8 parts by weight wheat flour, 3.7 parts butter, 18.2 parts hydrogenated vegetable oil shortening, 1.8 parts sugar, 0.7 part salt and 2.5 parts baking powder were dry mixed. The dry pie dough mix was then combined simultaneously with 32.8 parts of the previously prepared mashed potato and 7.5 parts water. The combined mix was then machine mixed to give it a uniform consistency after which it was refrigerated at a temperature of about 38° F. for a period of about four (4) hours. The mashed potato-pie crust dough was then removed from the refrigerator and worked into a thin sheet. The sheet was then sectioned into individual snack wrappers which were wrapped around frankfurter fillers to form the food snacks. The food snacks were then baked as in Example 1 thereafter being sampled without noting a discernible change from the results described in Example 1.

When the food snack is prepared with a dough comprised of a mixture of mashed potato and pastry dough, it offers the advantage that the snack can be prepared effectively and economically without the need for special extruding and sheeting devices. Moreover, the use of a homogenous dough mixture of mashed potato and pastry dough is quite compatible to the desirable end of producing a distinctive snack wrapping which cooks to a golden brown at the outside yet retains unique and quite readily detectable potato flavor and taste qualities on the inside of the wrapping. The foregoing occurs by reason of the migration or separation of the mashed potato from the homogenous mixture during cooking inwardly of the wrapping leaving the outer portion of the wrapping substantially all pie crust. The food snack 50 shown in FIG. 5 has an edible filler 52 encased in an edible casing 54. The filler in turn is wrapped in a dough 56 which is comprised of a homogenous mixture of mashed potato 58 and pastry dough 59, the dough 56 in its raw or uncooked state having no discernible different appearance than that of most flour base doughs. On the other hand, after the food snack is cooked, and as a consequence of cooking, the mashed potato 58 migrates from the homogenous dough mixture forming as it were an inner solely mashed potato layer in the snack wrapping, whereas, the pastry dough migrates to the outside of the wrapping. This feature of ingredient migration is clearly discernible in a cooked snack as illustrated in FIG. 6.

A preferred mode of making the food snack wrapping with a homogeneous dough mixture now will be described, it being understood that the sequence of steps and utilization of ingredients to be given are necessary to produce a homogenous dough mixture in which the mashed potato will migrate upon cooking as described earlier herein. 24 parts by weight dehydrated mashed potato mix is added to 39 parts by weight boiling water and the resultant mixture whipped for up to about 3 minutes or until the mixture assumes a flaky texture. Dehydrated egg white in powdered form is then dissolved in a quantity of 1.5 parts by weight in 6 parts of cold water. The egg white-water mixture may be strained one or more times to insure that the egg white is completely dissolved in the water. The egg white-water mixture is then beaten until it stands in peaks at which point it is added to the mashed potato and mixed therewith. The resulting mashed potato-egg white mixture is then set down to cool at ambient temperature preferably an ambient temperature of 70° F. Pastry dough is then prepared by dry mixing 60 parts by weight wheat flour with 30 parts by weight vegetable shortening and 6 parts by weight sweet butter until these ingredients are thoroughly blended. 9 parts by weight cold water, 3 parts by weight sugar and 2.75 parts by weight salt is then mixed together. The dry mixed flour mixture is then added to the cooled potato mixture and thoroughly blended therewith, after which the water-sugar-salt mixture is slowly blended into the potato-flour mixture until a homogenous dough mixture is produced and the wrapping dough has a relatively dry nonsticky texture. This dough is then placed in a retarder (refrigerator) for up to about 2 hours. The wrapping dough is then removed from the retarder and formed into sheets which in turn are formed into individual wrapping sections to be used for enclosing edible fillers therewith in the same manner as earlier described to produce the food snack. An egg wash can then be applied to the outside surface of the wrapping dough and the snack can be frozen, refrigerated or cooked immediately. The food snack can be cooked in a number of ways including oven baking, deep frying, electronic oven, etc. As a consequence of cooking the food snack, the mashed potato migrates from the homogenous mixture to form the distinctive inner mashed potato layer immediate the edible filler as indicated in FIG. 6. This separation of the mashed potato and pastry crust, among other things, provides for the achievement of the unique flavor possessed by the food snack.

It will be seen then from the foregoing that the present invention provides a method for making food snacks which are very palatable of taste, easy to make and store and are ideally suited for sale to restaurants, snack shops, and in retail and supermarket outlets. Moreover, they may be prepared in a cooked or uncooked state depending on the particular use intended. Most importantly, the food snack possesses a unique taste resulting from the employment of a meat filler and a mashed potato pastry crust wrapper which gives the food snack novel food characteristics.

It will thus be seen that the objects set forth above, among those made apparent from the preceding description, are efficiently attained. Since various changes in carrying out the method and certain modifications in the article which embodies the invention may be made without departing from its scope, it is intended that all matter contained in the above description or shown in the accompanying drawing shall be interpreted as illustrative and not in a limiting sense.

What is claimed is:

1. A method for preparing a food article having a high protein edible filler which comprises working a batter of pastry dough into a thin sheet, making a mixture of flaky mashed potato, preforming said mashed potato into a thin sheet and layering it onto said sheet of pastry dough to form a composite wrapper sheet, severing a composite wrapper section from said sheet, and enclosing said edible filler with said composite wrapper section.

2. The method of claim 1 wherein said sheet of pastry dough is a pie dough.

3. The method of claim 1 wherein said sheet of mashed potato is prepared with dehydrated mashed potato.

4. The method of claim 1 further comprising quick-freezing the food article after it is formed.

5. The method of claim 1 wherein an opening in the form of a slot is shaped in said wrapper section at the top of the food article and extending longitudinally thereof, and inwardly to sufficient depth to expose a portion of said meat filler, said slot defining a condiment receiving channel in the body of said food article.

6. The method of claim 1 wherein an aqueous wash of beaten fortified eggs is applied to the outer surface of said wrapper section after the food article is formed.

7. The method of claim 1 wherein both the pastry dough sheet and mashed potato sheet are formed as sheets of substantially uniform thickness, a composite wrapper section is severed from the composite wrapper sheet and the edible filler is positioned on the wrapper section in contact with the mashed potato with the wrapper section being thereafter molded around the edible filler to enclose the same and form the food article.

8. A method for preparing a food article having a high protein edible filler which comprises preparing whipped flaky mashed potato, thereafter preparing a dry pastry dough comprised of flour, hydrogenated vegetable oil and shortening, then combining the whipped mashed potato with the dry pastry dough while simultaneously adding water thereto, forming thereafter the combined mix into a thin sheet and enclosing said edible filler with said sheet.

9. A method for preparing a food article having a high protein edible filler which comprises preparing whipped flaky mashed potato and blending a beaten mixture of egg white and water into said mashed potato to form a mashed potato dough, preparing a dry mixture comprised of wheat flour, butter and vegetable shortening and blending it simultaneously with a mixture comprised of water, salt and sugar into said potato dough to produce a homogenous wrapping dough, and enclosing said edible filler in a wrapper section formed from said wrapping dough.

10. The method of claim 9 wherein said wrapping dough is refrigerated for a period prior to being formed into wrapper sections.

11. The method of claim 9 wherein an aqueous wash of beaten fortified eggs is applied to the outer surface of said wrapping dough wrapper section after enclosing the edible filler therewith.

12. A method for preparing a food article having a high protein edible filler which comprises preparing whipped flaky mashed potato comprised of substantially 24 parts by weight dehydrated mashed potato and 39 parts water and blending a beaten mixture of substantially 1.5 parts by weight egg white and 6 parts water into said mashed potato to form a mashed potato dough, preparing a dry mixture comprised of substantially 60 parts by weight wheat flour, 6 parts butter and 30 parts vegetable shortening and blending it simultaneously with a mixture comprised of substantially 9 parts by weight water, 3 parts sugar and 2.75 parts salt into said potato dough to produce a homogenous wrapping dough, and enclosing said edible filler in a wrapper section formed from said wrapping dough.

References Cited

UNITED STATES PATENTS

| 1,543,650 | 6/1925 | Lyons | 99—87 |
| 2,855,305 | 10/1958 | Cella | 99—87X |
| 3,143,424 | 8/1964 | Wilson | 99—1 |
| 3,329,511 | 7/1967 | Shewey | 99—1 |

OTHER REFERENCES

Everybody's Cook Book, by Lord, published by H. Holt & Co., 1924, pages 514 to 516 incl.

Encyclopedia of Cooking, vol. II, by Meta Givens, published by Ferguson and Associates, 1949, page 1091.

LAVERNE D. GEIGER, Primary Examiner

R. I. SMITH, Assistant Examiner

U.S. Cl. X.R.

99—107, 108, 109